United States Patent [19]
Snell

[11] Patent Number: 5,590,034
[45] Date of Patent: Dec. 31, 1996

[54] METHOD FOR CONTROLLING THE MOVEMENT OF AN INDUSTRIAL ROBOT AT AND NEAR SINGULARITIES

[75] Inventor: John-Erik Snell, Västerås, Sweden

[73] Assignee: ASEA Brown Boveri AB, Västerås, Sweden

[21] Appl. No.: 387,231

[22] Filed: Feb. 13, 1995

[30] Foreign Application Priority Data

Feb. 21, 1994 [SE] Sweden .................................... 9400579

[51] Int. Cl.$^6$ ........................... G06F 19/00; G05B 19/18
[52] U.S. Cl. ................. 364/167.01; 318/568.19; 395/86; 395/98
[58] Field of Search .................. 364/167.01, 191–193; 318/568.11, 568.19, 568.24; 395/97, 98, 86; 901/9

[56] References Cited

U.S. PATENT DOCUMENTS

| | | | |
|---|---|---|---|
| 4,763,276 | 8/1988 | Perreirra et al. | 364/167.01 X |
| 4,975,856 | 12/1990 | Vold et al. | 364/474.36 X |
| 4,999,553 | 3/1991 | Seravi | 364/478 X |

*Primary Examiner*—Joseph Ruggiero
*Attorney, Agent, or Firm*—Watson Cole Stevens Davis, P.L.L.C.

[57] ABSTRACT

A method for controlling an industrial robot such that a tool supported by the robot is able to follow a path which is determined by a number of consecutive points, and wherein the robot while following the path ends up near or a singularity. The robot has a plurality of movement axes and its configuration is determined by the angles of rotation of the movement axes. The angles of rotation which are to be assumed by the robot in order to obtain the desired position and orientation for the tool at the next point on the path are calculated by an iterative method. The ratio of the angular velocities of the axes to the velocity of the tool is given by a Jacobian matrix. By means of the Jacobian matrix it is determined whether the robot is at or near a singularity. The intention of the invention is to control the iteration such that the position of the tool remains correct through the singularity. A certain error in the orientation of the tool may be accepted. At a singularity the importance of the position errors is increased by weighting these errors during the iteration in relation to the orientation errors while at the same time locking the singular axes.

8 Claims, 5 Drawing Sheets

5,590,034

METHOD FOR CONTROLLING THE MOVEMENT OF AN INDUSTRIAL ROBOT AT AND NEAR SINGULARITIES

TECHNICAL FIELD

The present invention relates to a method for controlling an industrial robot such that a tool held by the robot may follow a given path determined by a number of consecutive points and wherein the robot while following the path ends up near or at a singularity. The robot has a plurality of movement axes and its configuration is determined by the angles of rotation of the movement axes. The relationship between the angular velocities of the axes and the velocity of the tool is given by a Jacobian matrix.

The invention also relates to a device for carrying out the method.

BACKGROUND ART

An industrial robot can be viewed as a chain of stiff links. Two links are joined to each other such that they are rotatable in relation to each other around a rotary axis. Each rotary axis is provided with a position transducer which measures the angle of rotation $\theta_i$, where "i" stands for the axis number. The configuration of the robot is described by the angles of rotation of the axes. Normally, an industrial robot has five or six rotary axes. In the following, a six-axis robot will be described but, of course, the invention is applicable to robots having a larger or smaller number of axes as well. The final link in the chain consists of a tool which, depending on the field of application, may be, for example, a gripper, a glue gun, or a spot welding equipment.

The position and orientation of a robot tool in space is described by three position coordinates and three orientation components ($X = x_1 \ldots x_6$), while at the same time the arm configuration of the robot is described by angular coordinates ($\theta = \theta_1 \ldots \theta_6$). The relationship between the coordinates of the tool and the angular coordinates of the robot may be described by means of a non-linear equation system and is usually called the kinematic equation of the robot:

$$X = F(\theta) \tag{1}$$

Equation (1) is normalized such that the position and orientation parts are comparable with respect to magnitude.

A common robot application means that the tool follows a given rectilinear path, for example during gluing or welding of a joint. In such applications it is normally important for the tool to follow the path precisely and without deviations. The path to be followed by the robot is determined by a plurality of consecutive points which indicate the coordinates of the tool in a reference coordinate system, for example the base coordinate system of the robot. For the robot to follow the path, the angles of rotation ($\theta$) of the points on the path must be determined from equation system (1). The problem of calculating the angles of rotation of the robot based on given tool coordinates is called the inverse kinematic problem. By deriving the kinematic equations, a relationship between the speed of the tool and the angular velocities of the robot is obtained as follows:

$$\frac{dX}{dt} = J(\theta) \frac{d\theta}{dt} \tag{2}$$

$$\frac{d\theta}{dt} = J(\theta)^{-1} \frac{dX}{dt} \tag{3}$$

For a six-axis robot the following applies:

$$\frac{d\theta}{dt} = \left( \frac{d\theta_1}{dt} \ldots \frac{d\theta_6}{dt} \right), \quad \frac{dX}{dt} = \left( \frac{dX_1}{dt} \ldots \frac{dX_6}{dt} \right)$$

$$J(\theta) = \frac{\partial F}{\partial \theta}$$

is a 6×6 matrix of partial derivatives and is designated the Jacobian matrix.

For the equation system (3) to have a solution to all the robot configurations, the Jacobian matrix must be invertible for all $\theta$. Most robots have one or more sets of $\theta$ for which the Jacobian matrix has no unambiguous solution, that is, the Jacobian is singular. The robot is then said to be in a singular configuration. At a singularity the configuration of the robot is such that two or more of the rotary axes of the robot coincide, which means that the robot has lost one or more of its degrees of freedom. At the singularity there is a direction in which the robot is unable to move regardless of the angular velocity chosen. For the robot to be able to pass near the singularity in this direction, a reconfiguration of the robot has to be made.

To be able to solve the inverse kinematic problem, numerical methods are being used today. However, these solutions do not particularly consider the singularities. One problem with the robots which are currently available on the market is that when the robot approaches a singularity, great reconfigurations of certain of the axes take place and these axes also attain very high axis velocities, and there is also a risk that the robot stops near the singularity.

For the robot to be able to follow a rectilinear path which passes through a singular point, two problems have to be solved. For one thing, the robot must detect that it approaches a singularity and, or another, it must be guided through the singularity such that the rectilinear path is followed. The passage through the singularity must not entail unnecessarily great reconfigurations of the axes.

U.S. Pat. No. 5,159,249 suggests a solution to the problem of detecting that the robot approaches a singularity, and of passing through the singularity without unnecessary reconfigurations of certain of the robot axes. The method comprises factorizing the Jacobian matrix, that is converting it into a product of several factors, wherein each of the factors may be inverted in a simple manner. The Jacobian matrix is factorized in such a way that one of the factors becomes a diagonal matrix. A diagonal matrix is inverted by inverting the diagonal elements. If any of the diagonal elements is smaller than a preset value, this is an indication that the robot approaches a singularity. On the basis of the diagonal elements which are smaller than this value, it is determined which axes run the risk of attaining high axis velocities and these axes are locked. When the axes are locked this means that the robot movement can only take place in certain directions.

The above method prevents the robot from stopping at the singularity, or from making considerable reconfigurations near the singularity. This is done at the expense of the position and orientation of the robot through the singularity. A disadvantage of this solution is that the robot cannot follow a given path through the singularity since the tool does not retain its position through the singularity.

SUMMARY OF THE INVENTION, ADVANTAGES

The invention aims to provide a method of controlling a robot which holds a tool and which follows a definite path, such that the tool at or near the singularity continues to follow the path. In the method the axis movements are moderate, that is, no unnecessarily great reconfigurations of the axes need be performed.

The invention also aims to provide an industrial robot having means for carrying out the above-mentioned method.

What characterizes a method and an industrial robot according to the invention will become clear from the appended claims.

DESCRIPTION OF THE PREFERRED EMBODIMENTS

Figure 1:
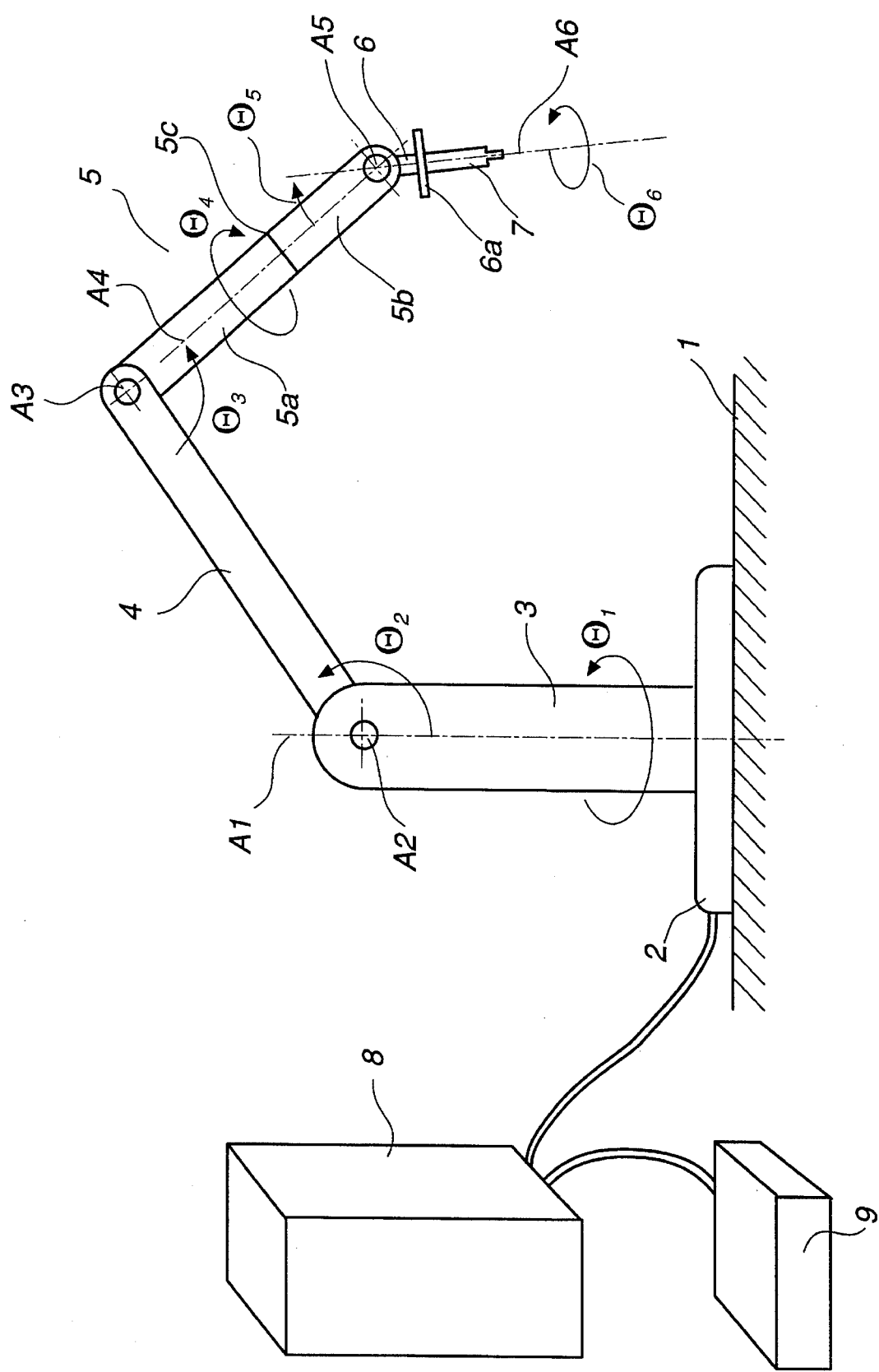
FIG. 1 schematically shows an industrial robot to which the invention may be applied.

FIG. 1 shows an example of a known industrial robot. On a base 1, the foot 2 of the robot is mounted. The robot has a base stand 3, which is rotatable in relation to the foot 2 about a vertical axis A1. At the upper end of the base stand, a first robot arm 4 is journalled and rotatable in relation to the base stand about a second axis A2. At the outer end of the arm, a second arm 5 is journalled and rotatable in relation to the first arm about an axis A3. The robot arm 5 consists of two parts 5a and 5b, the outer part 5b being rotatable in relation to the inner part 5a about a rotary axis A4 coinciding with the longitudinal axis of the arm. At its outer end, the arm 5 supports a so-called robot hand 6, which is rotatable about a rotary axis A5 perpendicular to the longitudinal axis of the arm. The robot hand comprises a tool attachment 6a. The outer part of the robot hand and hence the tool attachment 6a are rotatable in relation to the inner part of the robot hand about a rotary axis A6. The angles of rotation in the six rotary axes A1 ... A6 are designated ($\theta_1$ ... $\theta_6$) in the figure. The robot hand supports a tool 7.

The control unit 8 of the robot comprises in a known manner computer equipment with necessary storages for programs and other data, drive members for the driving motors of the different robot axes as well as necessary supply equipment. The control unit is connected to a programming unit 9 for programming and other operation of the robot.

Figure 2:
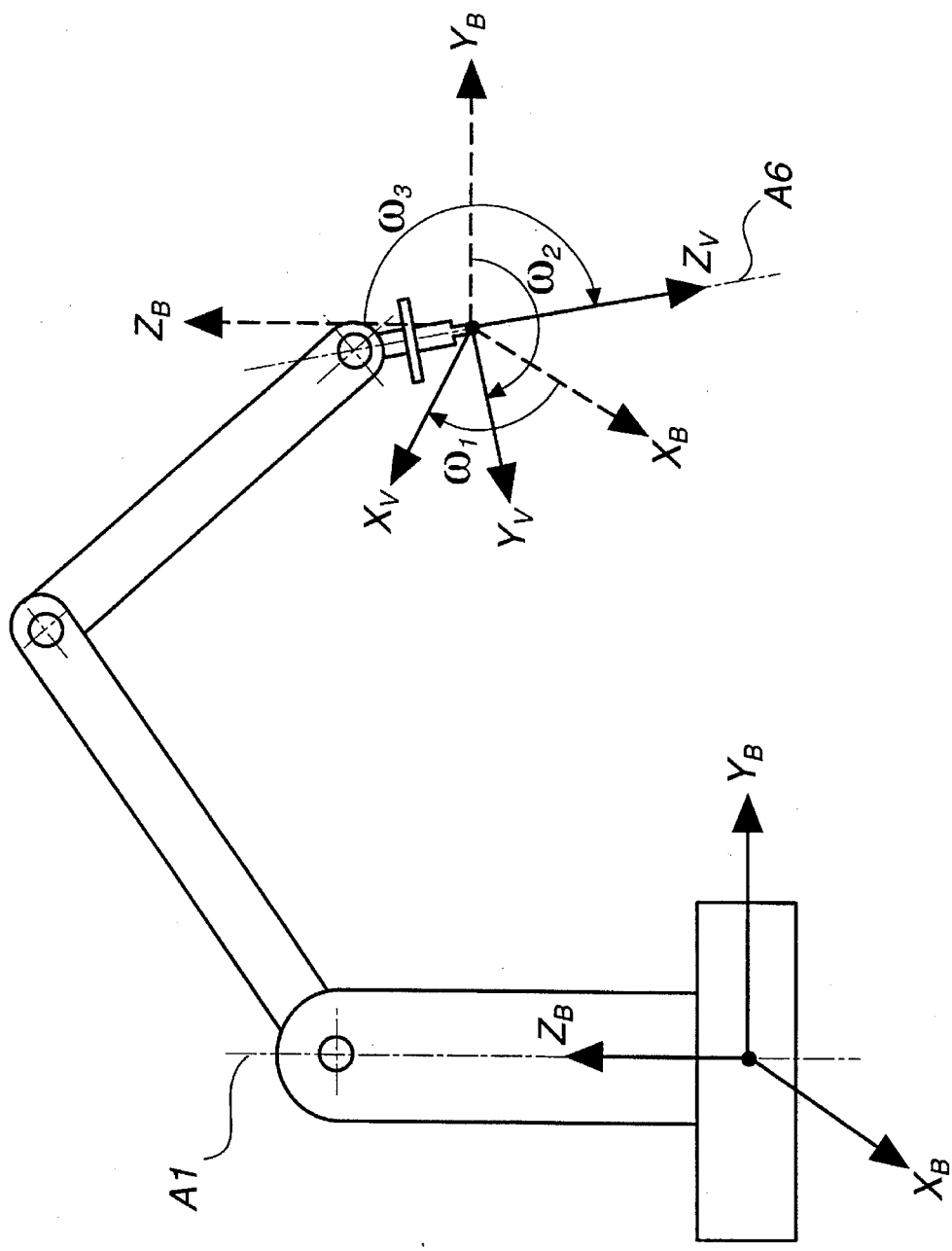
FIG. 2 shows the base coordinate system and the tool coordinate system of the robot.

FIG. 2 shows the base coordinate system ($X_B$, $Y_B$, $Z_B$) of the robot which is an orthogonal coordinate system with the z-axis coinciding with the rotary axis A1 and with the x-axis and the y-axis in predetermined directions relative to the robot foot 2. The figure also shows the tool coordinate systems ($X_v$, $Y_v$, $Z_v$) of the robot which is also an orthogonal coordinate system and the z-axis of which coincides with the rotary axis A6. The orientation of the tool coordinate system in relation to the base coordinate system is determined by the angles of rotation $w_1$, $w_2$, $w_3$. The position and orientation of a tool relative to the base coordinates are described by a vector $X=(x, y, z, w_1, w_2, w_3)$ wherein the position is given by the coordinates $(x, y, z)$ and the orientation is given by the coordinates $(w_1, w_2, w_3)$.

The path which is to be followed by the tool is defined by a plurality of points. The position and orientation of the tool at the point are given by a vector $X=(x_1 \ldots x_6)$, where $(x_1, x_2, x_3)$ indicates the position and $(x_4, x_5, x_6)$ indicates the orientation.

For each point on the path, the angles of rotation of the robot must be calculated such that the tool reaches the desired point on the path and is correctly oriented to be able to fulfil its; task. To solve $\theta$ from the kinematic equation (1), the Gauss-Newton method is used, which is an iterative method for solving non-linear equation systems. The Gauss-Newton method is described in the book "Numerical Methods", chapter 10.5.4, pages 443–444, by Dahlquist Germund, 1974, ISBN 0-13-627315-7. The equation system (1) is linearized and upon each iteration the following linear equation system is solved with respect to vector $\Delta\theta$:

$$J(\theta_n)\Delta\theta = X - F(\theta_n) \quad (4)$$

where X are the coordinates for the next point to where the robot is to be moved. In Equation (4) and in the remainder of the description, $\theta_{i,n}$, where n is the iteration number and i is the axis number, is abbreviated $\theta_n$.

Thereafter, a new solution vector $\theta_{n+1}$ is calculated:

$$\theta_{n+1} = \theta_n + \Delta\theta \quad (5)$$

Before the iteration can start, start values for the iteration ($\theta_0$) must be set. As start values it is suitable to set the angles of rotation of the preceding point. The errors in the position ($\epsilon_1 - \epsilon_3$) and the orientation ($\epsilon_4 - \epsilon_6$) of the tool for the set start values in relation to the desired position and orientation at the next point are calculated by inserting the start values and the coordinates for the next point in the righthand term of equation system (4):

$$\epsilon = X - F(\theta_n)$$

$$\epsilon = (\epsilon_1 \ldots \epsilon_6) \quad (6)$$

The iteration is repeated until the total error $E_{tot} = \sqrt{(\epsilon_1^2 + \epsilon_2^2 + \ldots + \epsilon_6^2)}$ is below a given tolerance value.

One object of the invention is to control the iteration such that the position of the tool becomes correct. An error in the orientation of the tool, on the other hand, may be accepted. By shifting the error from the position to the orientation at a singularity, the significance of the position errors is increased by weighting these errors in relation to the orientation errors. The position errors are weighted by a factor V which is suitably chosen to be between 100 and 200 but which in certain cases may be chosen to be up to 500. The errors are only weighted at or near a singularity:

$$\epsilon_{1s} = V\epsilon_1 \quad \epsilon_{4s} = \epsilon_4$$
$$\epsilon_{2s} = V\epsilon_2 \quad \epsilon_{5s} = \epsilon_5$$
$$\epsilon_{3s} = V\epsilon_3 \quad \epsilon_{6s} = \epsilon_6$$

To be able to calculate $\Delta\theta$ from the equation system (4), the Jacobian matrix must be factorized, that is, be divided into two or more factors. Several methods are available for the factorization, for example QR factorization or singular value decomposition (SVD). In a preferred embodiment of the invention, QR factorization is used. The basis of this factorization method is the following theorem which is well known within mathematics:

Each n×n matrix A can be factorized on the formula A=QR, where Q is an orthogonal matrix and R is a righthand triangular matrix. By righthand triangular is meant that all the elements below the main diagonal are zero. For the orthogonal matrix Q, $Q^{-1}=Q^T$. Transposing a matrix means a simple operation in which certain elements in the matrix change places with each other. Equation (4) can now be written on the formula:

$$R\Delta\theta = Q^T(X - F(\theta_n)) \quad (7)$$

Because R is triangular, the equation system (7) can be simply solved by resubstitution. If one or more of the elements on the main diagonal in R are small, that is, smaller than a given tolerance value ($D_{min}$), this means that the robot is near a singularity. In the following the elements on the main diagonal in R will be referred to as diagonal elements. The QR factorization is performed by partial pivoting, which means that the diagonal elements in R are arranged in decreasing order of magnitude. If equation system (7) contains a row of diagonal elements which are smaller than $D_{min}$, the $\Delta\theta$ which belongs to that row is given a high value, which means that the angular velocity of the corresponding axis becomes high. To avoid too high axis velocities, the rows containing diagonal elements smaller than $D_{min}$ are cancelled. The $\Delta\theta$ which disappear from the equation system when their rows are cancelled are instead given the value zero, which means that the corresponding axes are locked. The thus truncated equation system is solved by resubstitution.

For the QR factorization of $J(\theta_n)$ and the solution of the equation system (7), ready-to-use computer programs are available. One suitable program is described in greater detail in LINPAC users' guide, ISBN 0-89871-172-X, ninth edition 1992, chapter 9, pages 9.1–9.27. The program carries out QR factorization by partial pivoting. Further, the program carries out transposition of Q to $Q^T$, truncation of the equation system if the diagonal elements are smaller than a given tolerance value, and finally the equation system is solved by resubstitution.

To be able to determine when the iteration is to be terminated, the total error is calculated:

$$E_{tot} = \sqrt{(\epsilon_1^2 + \epsilon_2^2 + \epsilon_3^2 + \epsilon_4^2 + \epsilon_5^2 + \epsilon_6^2)} \quad (8)$$

At a singularity the weighted errors are used for calculating the total error:

$$E_{tot} = \sqrt{((V\epsilon_1)^2 + (V\epsilon_2)^2 + (V\epsilon_3)^2 + \epsilon_4^2 + \epsilon_5^2 + \epsilon_6^2)} \quad (9)$$

When $E_{tot}$ is below a tolerance value (T) for the total error, the iteration is terminated. Since a certain error in the orientation is allowed at a singularity, the tolerance for the total error muse be increased at the singularity. The tolerance value ($T_s$) is therefore multiplied by a factor k at a singularity:

$$T_s = kT \quad (10)$$

If the number of iterations exceed a given number ($n_{max}$), the weighting factor (V) and the tolerance factor (k) increase by 2, whereupon a restart of the iteration is made. If the number of restarts exceed a given number ($res_{max}$), the calculation is interrupted and an error message is generated to the effect that no convergence has been obtained. This causes the movement of the robot to cease.

Figure 3:
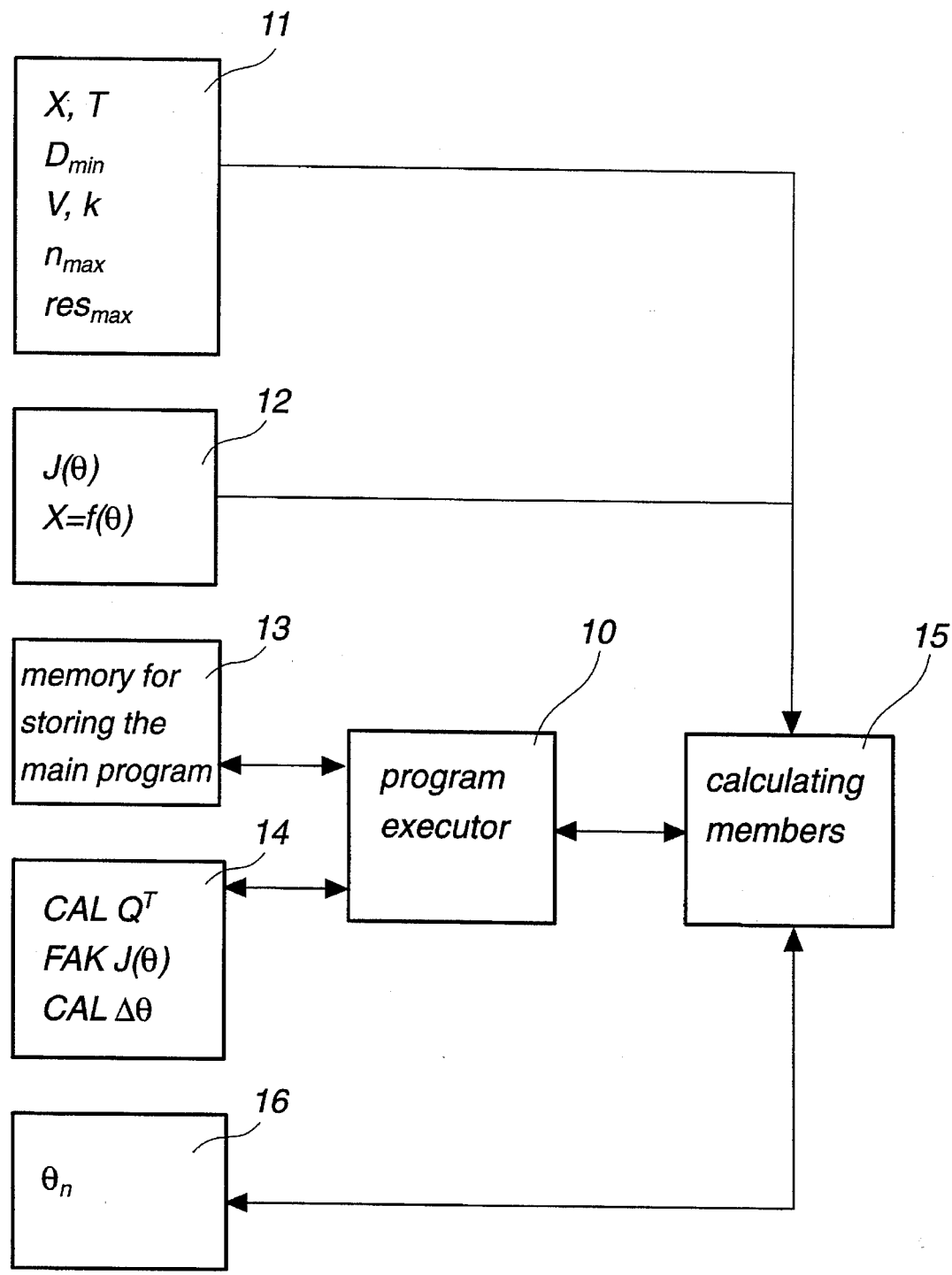
FIG. 3 schematically shows the configuration of part of the control unit of the robot according to the invention.

FIG. 3 shows part of the control equipment 8. A program executor 10 causes the robot in a known manner to carry out a stored program. A memory 11 stores the base coordinates (X) for the next point on the path which the robot is to follow, the tolerance value for the total error (T), the lowest tolerated value for any diagonal element at R for a non-singular point ($D_{min}$), the weighting factor (V) for weighting the position errors at a singularity, the tolerance factor (k) for increasing the total error at a singularity, the maximum number of allowed iterations ($n_{max}$), and the maximum number of allowed restarts ($res_{max}$). A memory 12 stores the kinematic model of the robot, $X=F(\theta)$, and the Jacobian matrix ($J(\theta)$). A memory 13 contains the main program for calculating the angles of rotation and a memory 14 contains subprograms (CALQ$^T$, FAC J($\theta$), CAL $\Delta\theta$) for carrying out certain specific algorithms. The control equipment further comprises calculating members 15 which carry out the necessary calculations. Memory 16 stores after each iteration the calculated angles of rotation ($\theta_n$) which will constitute start values for the next iteration.

Before starting the program, the estimated start values ($\theta_0$) are stored in the memory 16. The tolerance value for the total error (T), the lowest tolerated value of the diagonal element at R ($D_{min}$) and the base coordinates (X) of the next point on the path are stored into a memory 11.

Figure 4:
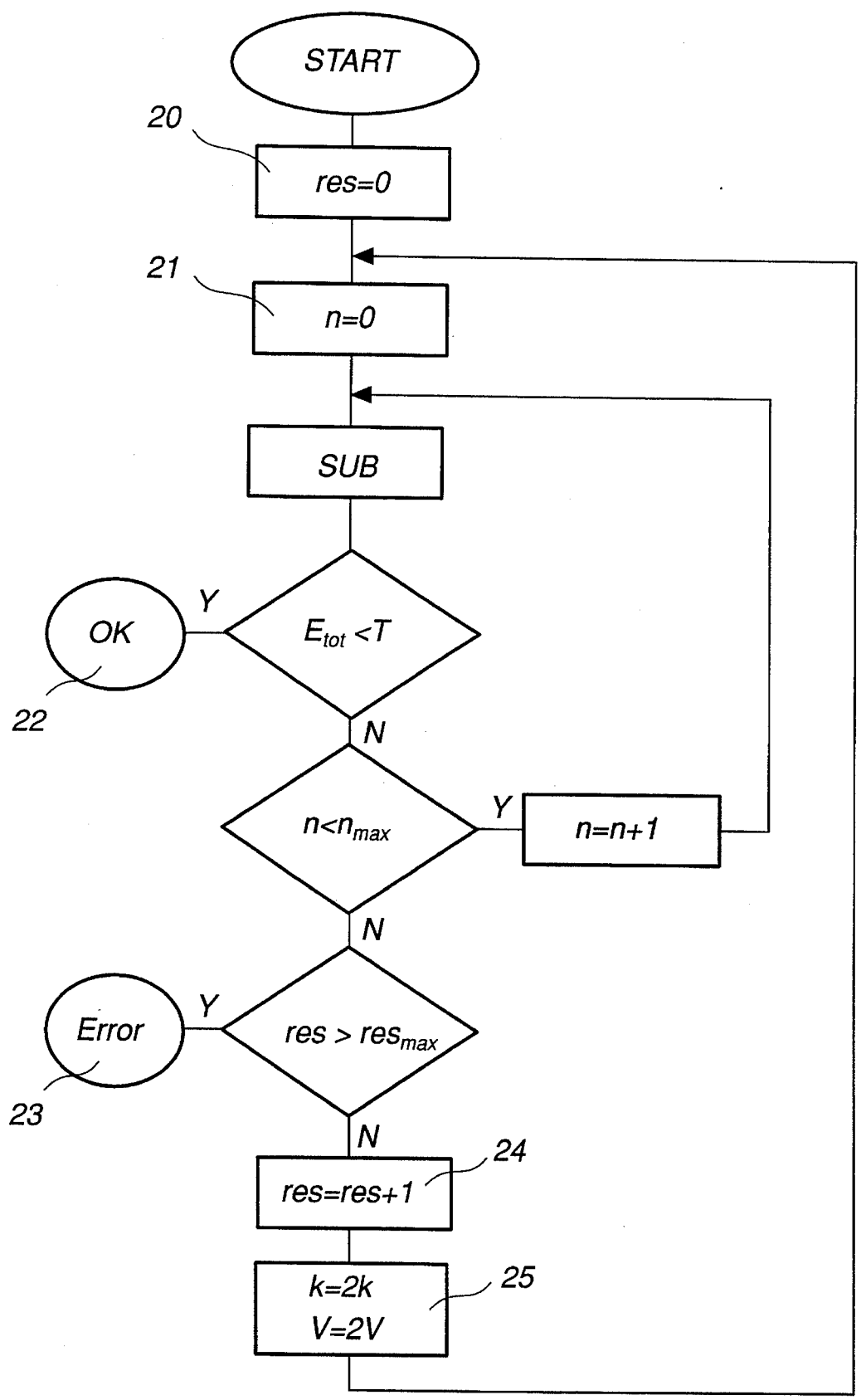
FIG. 4 shows in the form of a flow diagram an example of a program for calculating the angles of rotation of the robot axes according to the invention.

The configuration of the main program is shown in FIG. 4. The quantity n shows the number of iterations performed and the quantity res shows the number of restarts. After starting the program, n=0 and res=0 are set in blocks 20 and 21. In the subprogram SUB, the new angles of rotation $\theta_n+1$ and the total error ($E_{tot}$) are calculated. If the total error is below the tolerance value, the iteration is terminated, block 22. If the total error exceeds the tolerance value, and the number of iterations is smaller than the maximally allowed number, a new iteration is carried out. If the number of iterations is smaller than the maximally allowed number and if the number of restarts exceeds the maximally allowed number, an error message is generated and the iteration is interrupted in block 23. If the number of restarts is lower than the maximally allowed number, the variable res, that is, the number of restarts performed, is increased by 1 in block 24, and the weighting factor (V) and the tolerance factor (k) are increased by 2 in block 25. The iteration is restarted by setting the variable n to zero whereupon the next iteration is started.

Figure 5:
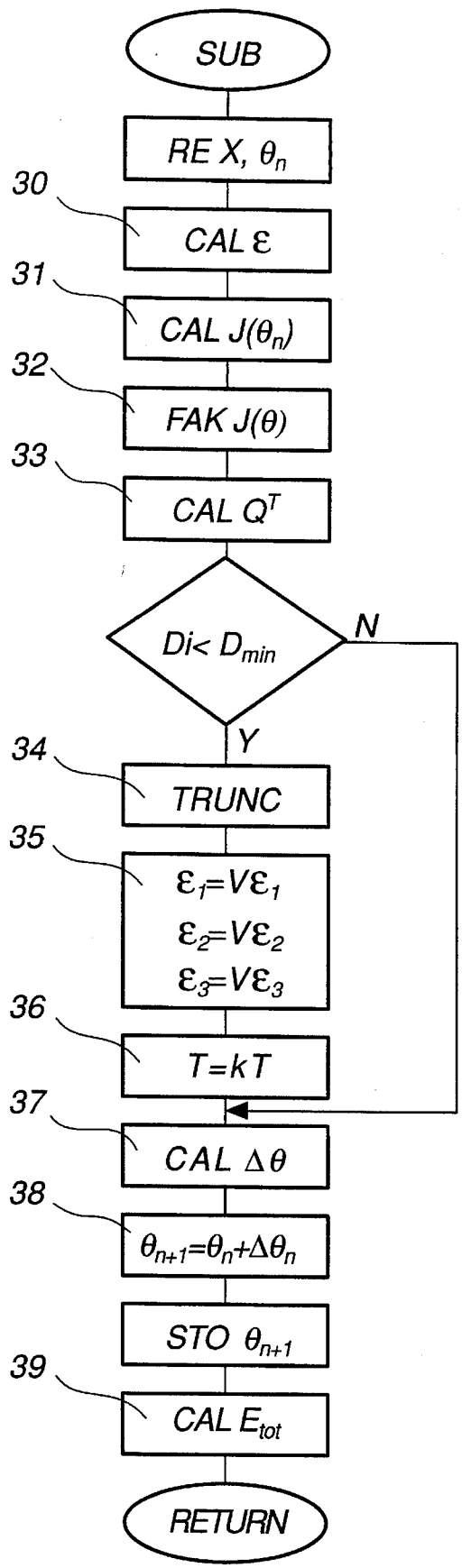
FIG. 5 a shows in the form of a flow diagram a subprogram to the program in FIG. 4.

FIG. 5 shows in the form of a block diagram the configuration of the subprogram SUB. The coordinates for the next point (X) and the start values ($\theta n$) are stored in the working storage of the equipment. Thereafter, the errors ($\epsilon$) in position and orientation for the start values are calculated in block 30, in accordance with equation (6). In block 31, the Jacobian matrix for the start values are calculated. In block 32, a subprogram (FAK J($\theta$)) is called, which performs QR factorization by partial pivoting of the Jacobian matrix, which means that the Jacobian matrix is divided up into an orthogonal matrix Q and a righthand triangular matrix R. The rows in R are arranged such that the diagonal elements ($D_i$, i=axis number) are positioned in a decreasing order of magnitude instead of the case of the Jacobian matrix where the rows were arranged according to a rising axis number. A subprogram (CAL $Q^T$) which transposes Q is called in block 33. If any of the diagonal elements ($D_i$) at R is smaller than Dmin, the robot is at or near a singularity, in which case the blocks 34–36 are carried out. The axes which are singular are identified as the axes whose axis numbers correspond to the diagonal elements which are smaller than $D_{min}$. The axes which have been identified as singular are locked to their start values by setting $\Delta\theta_i$ for these axes to zero, and the equation system is truncated by cancelling those rows which contain the diagonal elements which are smaller than $D_{min}$, block 34. The position errors ($\epsilon_1$–$\epsilon_3$) are weighted by the weighting factor (V) in block 35 and the tolerance value for the total error is increased by the factor k in block 36.

Thereafter, in block 37, a subprogram (CAL Δθ) is called, which calculates Δθ solving the equation system (7) by resubstitution. At a singularity the truncated equation system is solved. The new angles of rotation ($\theta_{n+1}$) are calculated in block 38 by adding the calculated Δθ to the start values ($\theta_{n+1}=\theta_n+\Delta\theta$). The new angles of rotation ($\theta_{n+1}$) constitute start values for the next iteration and are stored in storage 16. In block 39, the total error for the new angles of rotation is calculated according to equation 8.

With the method described above a robot with a tool may follow a rectilinear path in spite of the fact that the robot, while following the path, ends up in the vicinity or of at a singularity.

The invention is described above with reference to a robot having six axes. The method is also applicable to robots with a different number of axes.

I claim:

1. A method for controlling an industrial robot such that a tool supported by the robot can follow a path determined by a number of consecutive points, and wherein the robot while following the path ends up near or at a singularity, said robot having a plurality of movement axes (A1–A6) and the configuration of the robot being determined by the angles of rotation ($\theta_1$–$\theta_6$) of the movement axes, the ratio of the angular velocities of the axes to the velocity of the tool being given by a Jacobian matrix, the angles of rotation which the robot is to assume in order to obtain the correct position and orientation for the tool at the next point on the path being calculated as follows:

a) setting start values of the angles of rotation,
   b) calculating the errors in the position and orientation of the tool in relation to the desired position and orientation for the start values,
   c) calculating the total error,
   d) calculating new start values, based on the errors in the position and orientation of the tool,
   e) allowing steps b–d to constitute an iteration and repeating it until the total error is lower than a tolerance value for the total error, characterized in that the iteration comprises the following steps:

f) determining with the aid of the Jacobian matrix whether the robot is at or near a singularity,
   g) if the robot is at or near a singularity, carrying out the steps of:
      1) identifying those axes which are singular and setting their joint angle values to their start values,
      2) weighting the errors in the position of the tool in relation to the errors in the orientation of the tool by a weighting factor (V),
      3) increasing the tolerance value for the total error by a tolerance factor (k) such that it exceeds the tolerance for the total error for points outside the singularities,
      4) based on the weighted errors, calculating new start values for the next iteration.

2. A method according to claim 1, characterized in that if the number of iterations exceed a given maximum number ($n_{max}$)

a) the weighting factor is increased,
   b) the tolerance value is increased,
   c) the iteration is restarted.

3. A method according to claim 1, characterized in that the Jacobian matrix is factorized into a number of factors, and based on the magnitude of the diagonal elements of one of the factors, it is determined whether the robot is at or near a singularity.

4. A method according to claim 3, characterized in that the robot is assumed to be at or near a singularity if any of the diagonal elements in one of the factors to the Jacobian matrix is smaller than a given tolerance value.

5. A method according to claim 3, characterized in that the factorization takes place by a QR factorization method, where Q is an orthogonal matrix and R is a righthand triangular matrix.

6. A method according to claim 3, characterized in that the singular axes are identified as those axes whose diagonal elements are smaller than a given tolerance value.

7. A method according to claim 1, characterized in that the weighting factor has a value of between 50 and 500.

8. A method according to claim 1, characterized in that the tolerance factor has a value of between five and ten.

* * * * *